United States Patent
Kazama et al.

(10) Patent No.: US 11,789,172 B2
(45) Date of Patent: Oct. 17, 2023

(54) LIQUEFACTION EVALUATION MODEL GENERATION DEVICE, LIQUEFACTION EVALUATION DEVICE, NON-TRANSITORY RECORDING MEDIUM RECORDING LIQUEFACTION EVALUATION MODEL GENERATION PROGRAM, NON-TRANSITORY RECORDING MEDIUM RECORDING LIQUEFACTION EVALUATION PROGRAM, LIQUEFACTION EVALUATION MODEL GENERATION METHOD, AND LIQUEFACTION EVALUATION METHOD

(71) Applicant: TOHOKU UNIVERSITY, Miyagi (JP)

(72) Inventors: Motoki Kazama, Miyagi (JP); Akiyoshi Kamura, Miyagi (JP); Go Kurihara, Miyagi (JP)

(73) Assignee: TOHOKU UNIVERSITY, Miyagi (JP)

( * ) Notice: Subject to any disclaimer, the term of this patent is extended or adjusted under 35 U.S.C. 154(b) by 190 days.

(21) Appl. No.: 17/367,074

(22) Filed: Jul. 2, 2021

(65) Prior Publication Data

US 2022/0003887 A1    Jan. 6, 2022

(30) Foreign Application Priority Data

Jul. 6, 2020    (JP) ................. 2020-116602

(51) Int. Cl.
*G01V 1/30*     (2006.01)
*G06N 20/00*   (2019.01)
(Continued)

(52) U.S. Cl.
CPC .............. *G01V 1/306* (2013.01); *G01V 1/282* (2013.01); *G06N 5/04* (2013.01); *G06N 20/00* (2019.01); *G01V 2210/62* (2013.01)

(58) Field of Classification Search
CPC .... G01V 1/306; G01V 1/282; G01V 2210/62; G06N 20/00; G06N 5/04
See application file for complete search history.

(56) References Cited

U.S. PATENT DOCUMENTS 11,004,001 B1 * 5/2021 Frank ................. G06N 5/04
11,341,410 B1 * 5/2022 Johnson ............. G06N 5/01
(Continued)

FOREIGN PATENT DOCUMENTS

JP    S61294018         12/1986
JP    S61294018 A  *  12/1986
(Continued)

OTHER PUBLICATIONS

JP Office Action for JP Application No. 2020-116602 dated Mar. 22, 2023 6 pages.
(Continued)

*Primary Examiner* — Raymond L Nimox
(74) *Attorney, Agent, or Firm* — Lee & Hayes, P.C.

(57) ABSTRACT

A liquefaction evaluation model generation device includes a data acquisition unit configured to acquire training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer, and a machine learning execution unit configured to execute machine learning using the training data and generate a liquefaction evaluation model that is a machine learning model. A liquefaction evaluation device includes a data acquisition unit configured to acquire inference vibration data indicating a physical quantity associated with vibrations observed in the ground and an inference execution unit configured to input the inference vibration data to the above-described
(Continued)

machine learning model and cause the machine learning model to output inference liquefaction data indicating the degree of liquefaction occurring in the ground where the vibrations associated with the inference vibration data have been observed.

10 Claims, 7 Drawing Sheets

(51) Int. Cl.
*G01V 1/28* (2006.01)
*G06N 5/04* (2023.01)

(56) References Cited

U.S. PATENT DOCUMENTS

| | | | |
|---|---|---|---|
| 2007/0092341 | A1 | 4/2007 | Schmertmann |
| 2015/0160182 | A1* | 6/2015 | Noda .................... G01N 15/08 702/2 |
| 2017/0169534 | A1* | 6/2017 | Wani .................... G06Q 50/265 |
| 2018/0336652 | A1* | 11/2018 | Wani ................ G06Q 10/06375 |
| 2021/0110280 | A1* | 4/2021 | Akkurt ..................... G01V 5/12 |
| 2022/0139092 | A1* | 5/2022 | Hashimoto ............ G06N 3/045 382/156 |
| 2022/0213774 | A1* | 7/2022 | Kakutani ............ E21B 43/2605 |
| 2023/0042178 | A1* | 2/2023 | Ohno .................. G01S 13/9023 |

FOREIGN PATENT DOCUMENTS

| | | | |
|---|---|---|---|
| JP | H0875865 A | * | 3/1996 |
| JP | H0875865 A | | 3/1996 |
| JP | H08179047 A | | 7/1996 |
| JP | 11084017 | | 3/1999 |
| JP | 2001032253 | | 2/2001 |
| JP | 2003262571 | | 9/2003 |
| JP | 2003262571 A | * | 9/2003 |
| JP | 2003287574 | | 10/2003 |

OTHER PUBLICATIONS

Conference program book of Geotec Hanoi 2019, 8 pages.
Kurihara, et al., Slide: Machine learning scheme of the degree of liquefaction assessment only from the health monitoring device installed in individual wooden house, 2019, 16 pages.
Kurihara et al., Machine learning scheme of the degree of liquefaction assessmentonly from the health monitoring device installed in individual wooden house, Geotecnis for Sustainable Infrastructure Development—Geotec Hanoi 2019, 7 pages.
The 4th International Conference on Geotechnics for Sustainable InfrastructureDevelopment, 2019, <Internet> https://www.issmge.org/events/geotec-hanoi-2019, 3 pages.
JP Office Action for JP Application No. 2020-116602, dated Oct. 25, 2022, 6 pages.

* cited by examiner

LIQUEFACTION EVALUATION MODEL GENERATION DEVICE, LIQUEFACTION EVALUATION DEVICE, NON-TRANSITORY RECORDING MEDIUM RECORDING LIQUEFACTION EVALUATION MODEL GENERATION PROGRAM, NON-TRANSITORY RECORDING MEDIUM RECORDING LIQUEFACTION EVALUATION PROGRAM, LIQUEFACTION EVALUATION MODEL GENERATION METHOD, AND LIQUEFACTION EVALUATION METHOD

CROSS REFERENCE TO RELATED APPLICATIONS

This Application claims priority to Japan Patent Application No. 2020-116602, filed Jul. 6, 2020, which is incorporated herein by reference.

BACKGROUND OF THE INVENTION

Field of the Invention

The present invention relates to a liquefaction evaluation model generation device, a liquefaction evaluation device, a non-transitory recording medium recording a liquefaction evaluation model generation program, a non-transitory recording medium recording a liquefaction evaluation program, a liquefaction evaluation model generation method, and a liquefaction evaluation method.

Priority is claimed on Japanese Patent Application No. 2020-116602, filed Jul. 6, 2020, the content of which is incorporated herein by reference.

Description of Related Art

Liquefaction is a phenomenon in which strength is rapidly lost where a groundwater level is high and when the ground becomes liquefied due to the application of vibrations such as earthquakes and construction work to the loose ground containing a large amount of sand. Liquefaction causes severe damage to structures located on the ground surface and underground. Thus, the practical application of technology for evaluating the degree of liquefaction is desired. Also, as an example of the above technology, a liquefaction determination method disclosed in Japanese Patent Application, First Publication No. H08-179047 may be mentioned.

In the above liquefaction determination method, magnitudes of geological features, geographical features, and seismic motions, which are actual values of a liquefaction phenomenon caused by earthquakes that occurred in the past, and an observed degree of liquefaction may be given to a neural network as training data for learning. Next, in the liquefaction determination method, the magnitudes of the geological features, the geographical features, and the seismic motions at a point where liquefaction needs to be determined are given to the learned neural network as input data and an index indicating the degree of liquefaction is obtained as output data. In the liquefaction determination method, liquefaction is determined by comparing the obtained index with a threshold value preset in a processing circuit.

The above-described actual values of the geological feature and the geographical feature are collected by, for example, boring, Swedish sounding tests, and surface wave exploration. However, the work for collecting data associated with the ground such as a geological feature and a geographical feature requires a great deal of labor. On the other hand, when the above-described liquefaction determination method is used, it may be necessary to perform work for collecting a large amount of data associated with the ground such as a geological feature and a geographical feature to sufficiently train the neural network.

SUMMARY OF THE INVENTION

Therefore, an objective of the present invention is to provide a liquefaction evaluation model generation device, a liquefaction evaluation device, a non-transitory recording medium recording a liquefaction evaluation model generation program, a non-transitory recording medium recording a liquefaction evaluation program, a liquefaction evaluation model generation method, and a liquefaction evaluation method capable of evaluating the degree of liquefaction while omitting work for collecting data associated with the ground.

According to an aspect of the present invention, there is provided a liquefaction evaluation model generation device including: a data acquisition unit configured to acquire training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer; and a machine learning execution unit configured to execute machine learning using the training data and generate a liquefaction evaluation model that is a machine learning model.

In the above-described liquefaction evaluation model generation device, the data acquisition unit may acquire the training data in which the learning vibration data indicating a physical quantity associated with vibrations observed by a seismometer attached to simulated ground vibrated by a vibration table is defined as a question and the learning liquefaction data indicating a pore water pressure observed by a pore water pressure gauge embedded in the simulated ground is defined as an answer.

In the above-described liquefaction evaluation model generation device, the data acquisition unit may acquire the training data in which the learning vibration data indicating a physical quantity associated with vibrations observed by a seismometer attached to the ground is defined as a question and the learning liquefaction data indicating a pore water pressure observed by a pore water pressure gauge embedded in the ground where vibrations associated with the learning vibration data have been observed is defined as an answer.

In the above-described liquefaction evaluation model generation device, the data acquisition unit may acquire the training data in which the learning vibration data indicating a physical quantity associated with vibrations observed by a seismometer attached to simulated ground vibrated by a vibration table is defined as a question and the learning liquefaction data indicating the degree of underground stress observed by an earth pressure gauge embedded in the simulated ground is defined as an answer.

In the above-described liquefaction evaluation model generation device, the data acquisition unit may acquire the training data in which the learning vibration data indicating a physical quantity associated with vibrations observed by a seismometer attached to the ground is defined as a question and the learning liquefaction data indicating the degree of underground stress observed by an earth pressure gauge embedded in the ground where vibrations associated with the learning vibration data have been observed is defined as an answer.

According to an aspect of the present invention, there is provided a liquefaction evaluation device including: a data acquisition unit configured to acquire inference vibration data indicating a physical quantity associated with vibrations observed in the ground; and an inference execution unit configured to input the inference vibration data to a machine learning model generated by executing machine learning using training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer, and cause the machine learning model to output inference liquefaction data indicating the degree of liquefaction occurring in the ground where the vibrations associated with the inference vibration data have been observed.

According to an aspect of the present invention, there is provided a non-transitory recording medium recording a liquefaction evaluation model generation program for causing a computer to execute: a data acquisition function of acquiring training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer; and a machine learning execution function of executing machine learning using the training data and generating a liquefaction evaluation model that is a machine learning model.

According to an aspect of the present invention, there is provided a non-transitory recording medium recording a liquefaction evaluation program for causing a computer to execute: a data acquisition function of acquiring inference vibration data indicating a physical quantity associated with vibrations observed in the ground; and an inference execution function of inputting the inference vibration data to a machine learning model generated by executing machine learning using training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer, and causing the machine learning model to output inference liquefaction data indicating the degree of liquefaction occurring in the ground where the vibrations associated with the inference vibration data have been observed.

According to an aspect of the present invention, there is provided a liquefaction evaluation model generation method including: acquiring training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer; and executing machine learning using the training data and generating a liquefaction evaluation model that is a machine learning model.

According to an aspect of the present invention, there is provided a liquefaction evaluation method including: acquiring inference vibration data indicating a physical quantity associated with vibrations observed in the ground; and inputting the inference vibration data to a machine learning model generated by executing machine learning using training data in which learning vibration data indicating a physical quantity associated with vibrations observed in the ground is defined as a question and learning liquefaction data indicating the degree of liquefaction occurring in the ground where the vibrations associated with the learning vibration data, have been observed is defined as an answer, and causing the machine learning model to output inference liquefaction data indicating the degree of liquefaction occurring in the ground where the vibrations associated with the inference vibration data have been observed.

According to the present invention, it is possible to evaluate the degree of liquefaction while omitting work for collecting data associated with the ground.

DETAILED DESCRIPTION OF THE INVENTION

Figure 1:
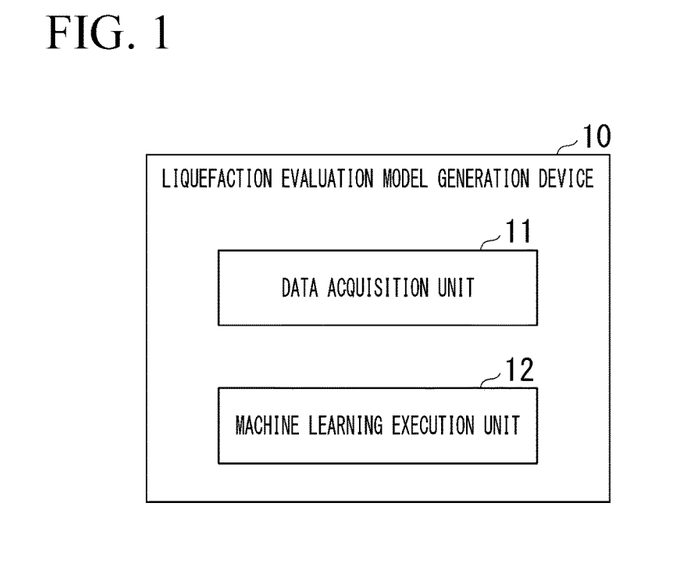
FIG. 1 is a diagram showing an example of a functional configuration of a liquefaction evaluation model generation device according to an embodiment of the present invention.

A liquefaction evaluation model generation device 10 according to the embodiment will be described with reference to FIGS. 1 to 8. FIG. 1 is a diagram showing an example of a functional configuration of the liquefaction evaluation model generation device according to the embodiment of the present invention. As shown in FIG. 1, the liquefaction evaluation model generation device 10 includes a data acquisition unit 11 and a machine learning execution unit 12.

The data acquisition unit 11 acquires training data in which learning vibration data is defined as a question and learning liquefaction data is defined as an answer.

The learning vibration data is data indicating a physical quantity associated with vibrations observed in the ground. The ground mentioned herein includes artificial ground, simulated ground reproduced in a laboratory, and the like as well as a surface layer of the crust. The vibrations mentioned herein are vibrations generated by an earthquake, construction work, or the like. For example, the physical quantity indicated by the learning vibration data may be acceleration, velocity, or displacement measured by a seismometer, and a physical quantity calculated on the basis of these physical quantities.

The learning liquefaction data is data indicating the degree of liquefaction occurring in the ground where vibrations associated with the learning vibration data have been observed. The degree of liquefaction is, for example, a value of a pore water pressure measured by a pore water pressure gauge and a value calculated using the value of the pore water pressure. Also, as the value calculated using the pore water pressure, for example, the excess pore water pressure and the excess pore water pressure ratio may be used.

Figure 2:
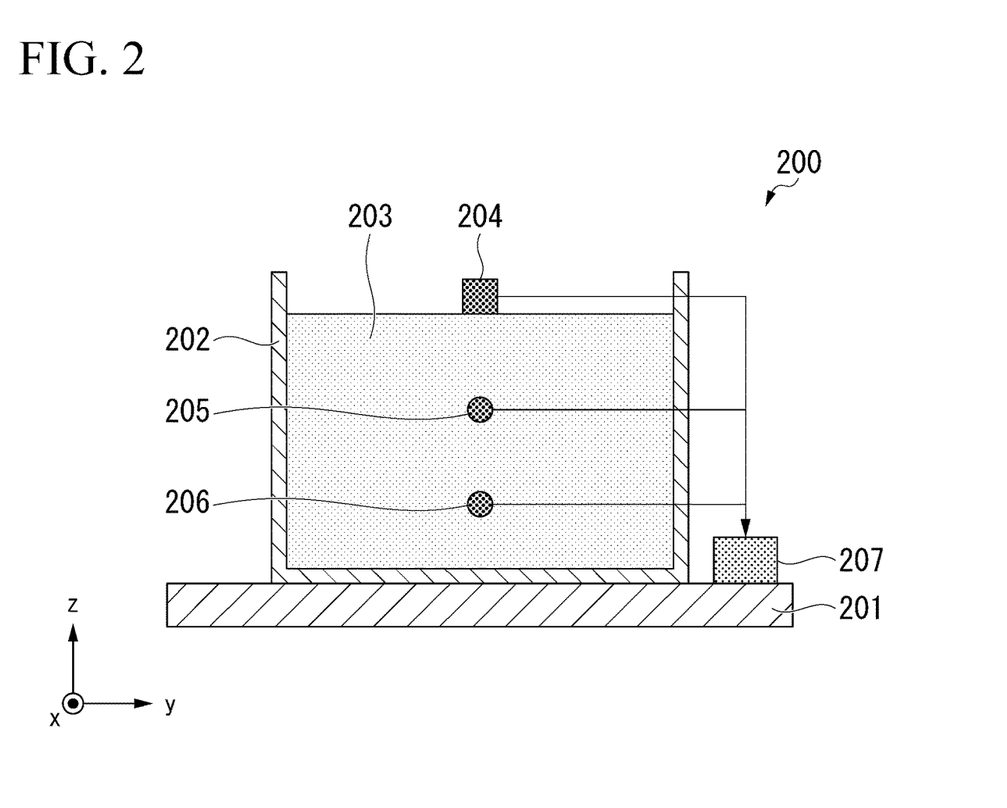
FIG. 2 is a diagram showing an example of a cross section of a vibration table test device in a plane parallel to a YZ plane according to the embodiment of the present invention.

FIG. 2 is a diagram showing an example of a cross section of a vibration table test device in a plane parallel to a YZ plane according to the embodiment of the present invention. For example, the data acquisition unit 11 acquires training data acquired by the test using the vibration table test device 200 shown in FIG. 2. As shown in FIG. 2, the vibration table test device 200 includes a vibration table 201, a tank 202, simulated ground 203, a seismometer 204, a pore water pressure gauge 205, a pore water pressure gauge 206, and a data processing device 207.

Also, in the description of the vibration table test device 200, three-dimensional cartesian coordinates associated with an X-axis, a Y-axis, and a Z-axis forming a right-handed system shown in FIG. 2 are used. The X-axis is an axis parallel to a north-south direction. The Y-axis is an axis parallel to an east-west direction. The Z-axis is an axis parallel to a direction of gravity.

Figure 3:
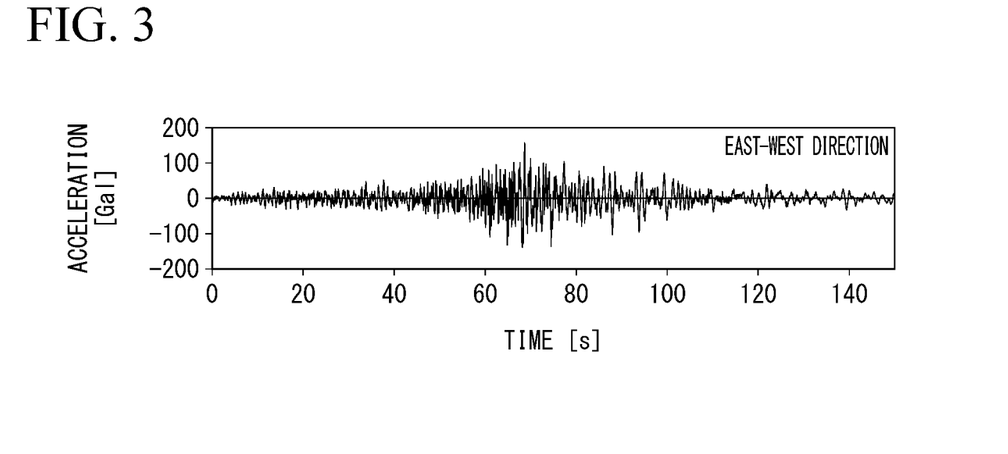
FIG. 3 is a diagram showing a time history of the acceleration in an east-west direction observed in Urayasu City during the 2011 off the Pacific Coast of Tohoku Earthquake.
Figure 4:
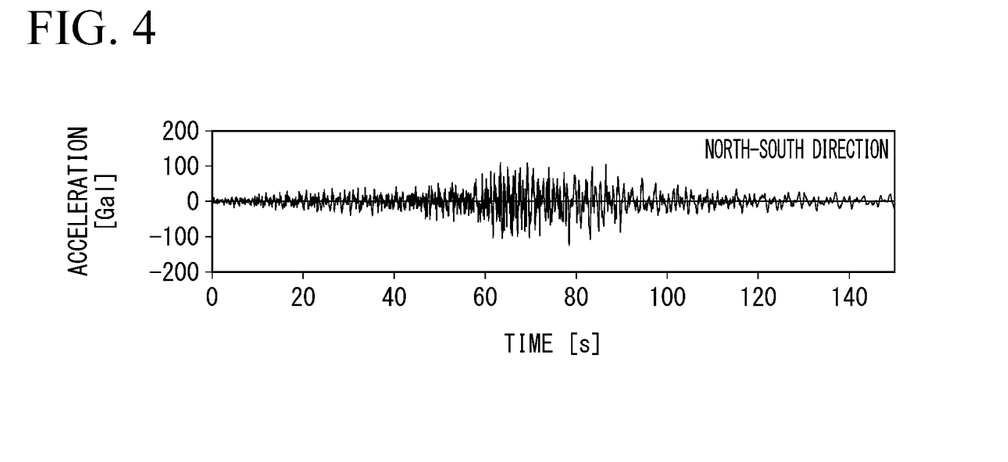
FIG. 4 is a diagram showing a time history of the acceleration in a north-south direction observed in Urayasu City during the 2011 off the Pacific Coast of Tohoku Earthquake.
Figure 5:
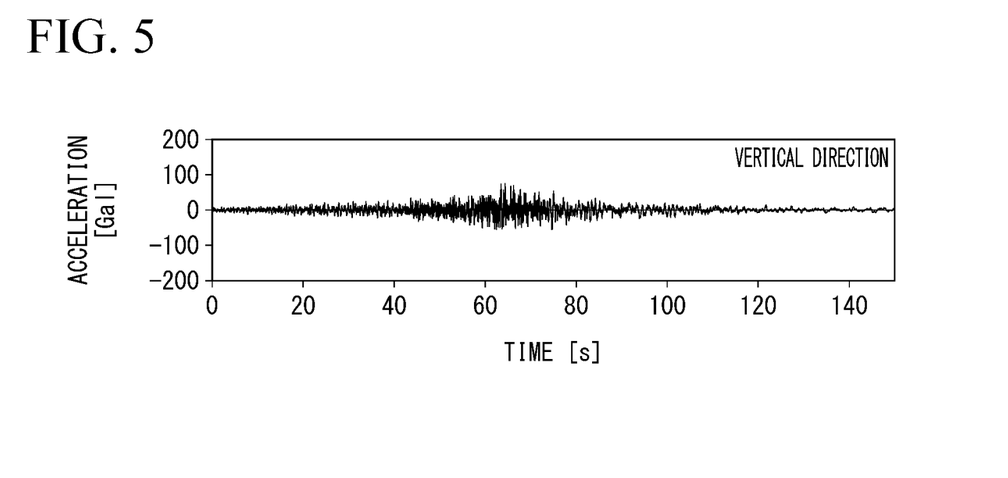
FIG. 5 is a diagram showing a time history of the acceleration in a vertical direction observed in Urayasu City during the 2011 off the Pacific Coast of Tohoku Earthquake.

The vibration table 201 is a table that vibrates in the X-direction, the Y-direction, and the Z-direction. For example, the vibration table 201 generates vibrations by scaling up the seismic motion of an earthquake that occurred in the past or generates vibrations by scaling down the seismic motion of an earthquake that occurred in the past. Also, as examples of data associated with the seismic motion of an earthquake that occurred in the past, there are time histories of the acceleration shown in FIGS. 3, 4, and 5. FIG. 3 is a diagram showing a time history of the acceleration in an east-west direction observed in Urayasu City during the 2011 off the Pacific Coast of Tohoku Earthquake. FIG. 4 is a diagram showing a time history of the acceleration in a north-south direction observed in Urayasu City during the 2011 off the Pacific Coast of Tohoku Earthquake. FIG. 5 is a diagram showing a time history of the acceleration in a vertical direction observed in Urayasu City during the 2011 off the Pacific Coast of Tohoku Earthquake. In FIGS. 3, 4 and 5, the horizontal axis represents time and the vertical axis represents acceleration.

The tank 202 is a container fixed to the vibration table 201 and configured to retain the simulated ground 203. For example, the tank 202 is a metal container whose internal dimensions in the X, Y, and Z directions are all 500 mm.

Figure 6:
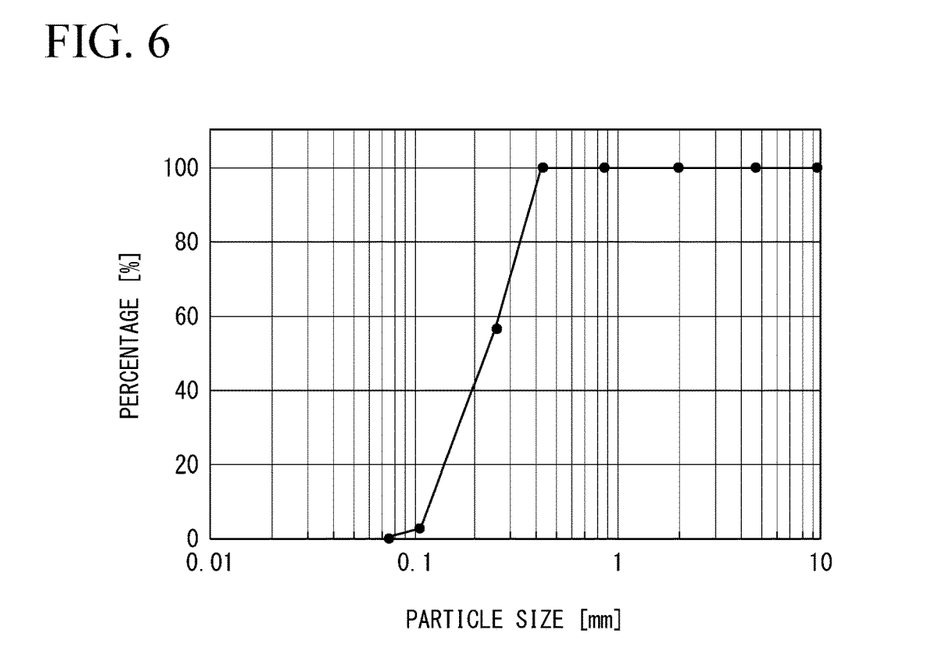
FIG. 6 is a diagram showing an example of particle sizes distribution in a sample constituting simulated ground used in a vibration table test according to the embodiment of the present invention.

The simulated ground 203 is earth and sand retained by the tank 202 and may contain water or stones. FIG. 6 is a diagram showing an example of particle sizes distribution in a sample constituting simulated ground used in a vibration table test according to the embodiment of the present invention. In FIG. 6, the horizontal axis represents a particle size and the vertical axis represents a percentage. For example, the simulated ground 203 is Gifu silica sand No. 7 whose cumulative percentage of particle size is represented by the graph shown in FIG. 6. The depth of the simulated ground 203 is, for example, 450 mm.

For example, the seismometer 204 is installed at a position where distances from two wall surfaces of the tank 202 parallel to a YZ plane are equal and distances from two wall surfaces of the tank 202 parallel to a ZX plane are equal on the surface of the simulated ground 203. The seismometer 204 executes a process of measuring the acceleration in the X-direction, the acceleration in the Y-direction, and the acceleration in the Z-direction, and transmits data indicating a time history of in the measured acceleration to the data processing device 207.

The pore water pressure gauge 205 is embedded at a position where the depth of the simulated ground 203 is 150 mm, distances from the two wall surfaces of the tank 202 parallel to the YZ plane are equal, and distances from the two wall surfaces of the tank 202 parallel to the ZX plane are equal. The pore water pressure gauge 206 is embedded at a position where the depth of the simulated ground 203 is 300 mm, distances from the two wall surfaces of the tank 202 parallel to the YZ plane are equal, and distances from the two wall surfaces of the tank 202 parallel to the ZX plane are equal. Both the pore water pressure gauge 205 and the pore water pressure gauge 206 execute a process of measuring the pore water pressure of the simulated ground 203 and transmit data indicating a time history of the measured pore water pressure to the data processing device 207.

The data processing device 207 receives data indicating a time history of acceleration from the seismometer 204 and stores the data in the storage device. Also, the data processing device 207 may calculate at least one of the maximum acceleration, the duration, the primary dominant frequency, the maximum speed, and the spectral intensity (SI) value on the basis of the above data. The above physical quantities are calculated for each of a north-south direction component, an east-west direction component, and a vertical direction component of acceleration. Alternatively, the data processing device 207 may calculate at least one of a measured seismic intensity, the degree of damage to a structure, and the degree of damage to the ground due to the inclination on the basis of the data. The data processing device 207 stores the above-described data indicating the physical quantity in the storage device as learning vibration data. The above learning vibration data is acquired by the data acquisition unit 11 as a question of training data.

Figure 7:
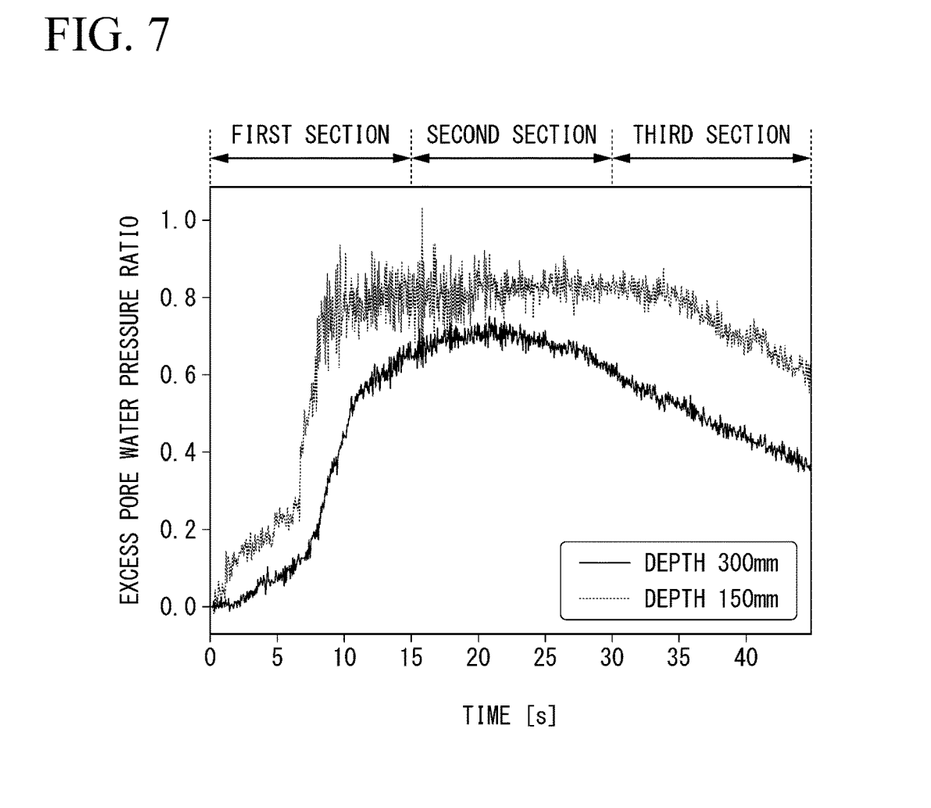
FIG. 7 is a diagram showing an example of a time history of an excess pore water pressure ratio calculated using the pore water pressure measured in the vibration table test according to the embodiment of the present invention.

The data processing device 207 receives data indicating a time history of the pore water pressure from each of the pore water pressure gauge 205 and the pore water pressure gauge 206 and stores the data in the storage device. Also, for example, the data processing device 207 calculates a time history of the excess pore water pressure ratio shown in FIG. 7 on the basis of the data. FIG. 7 is a diagram showing an example of time history of an excess pore water pressure ratio calculated using the pore water pressure measured in the vibration table test according to the embodiment of the present invention. In FIG. 7, the horizontal axis represents time and the vertical axis represents an excess pore water pressure ratio. Also, the broken line shown in FIG. 7 indicates an example of the time history of the excess pore water pressure ratio calculated on the basis of the time history of the pore water pressure measured by the pore water pressure gauge 205. On the other hand, the solid line shown in FIG. 7 indicates an example of the time history of the excess pore water pressure ratio calculated on the basis of the time history of the pore water pressure measured by the pore water pressure gauge 206.

Next, the data processing device 207 calculates a time average of time integrals of at least a part of a graph indicated by the broken line in FIG. 7. For example, the data processing device 207 calculates a time average of an area of a region sandwiched between a part included in a second section or a third section and the horizontal axis within the graph indicated by the broken line in FIG. 7. Likewise, the data processing device 207 calculates the time average of time integrals of at least a part of the graph indicated by the broken line in FIG. 7. For example, the data processing device 207 calculates the time average of an area of a region sandwiched between the second section or the third section and the horizontal axis of the graph indicated by the solid line in FIG. 7. Here, the reason why the time average of the time integrals only for the part included in the second section or the third section is calculated is that it is necessary to distinguish a part where the excess pore water pressure ratio is temporarily increased and a part where an amount of change in the excess pore water pressure ratio is relatively small.

Figure 8:
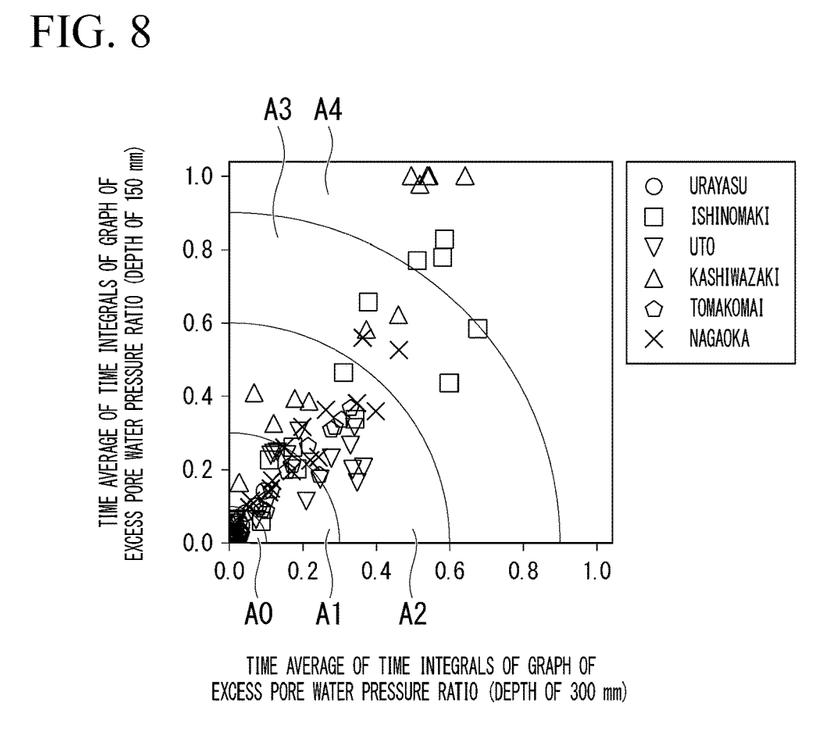
FIG. 8 is a diagram showing an example of a relationship between the degree of liquefaction and the excess pore water pressure ratio according to the embodiment of the present invention.

FIG. 8 is a diagram showing an example of a relationship between the degree of liquefaction and the excess pore water pressure ratio according to the embodiment of the present invention. FIG. 8 shows a time average calculated on the basis of the graph whose vertical axis is indicated by the broken line in FIG. 7 and a time average calculated on the basis of the graph whose horizontal axis is indicated by the solid line in FIG. 7. A circle, a square, a downward triangle, an upward triangle, a pentagon, and an X mark shown in FIG. 8 indicate results obtained by the above-described test conducted by appropriately changing a scale of at least one of amplitudes and times of seismic motions of earthquakes that actually occurred in Urayasu, Ishinomaki, Uto, Kashiwazaki, Tomakomai, and Nagaoka, respectively. The data processing device 207 divides a two-dimensional plane shown in FIG. 8 into five regions of region A0, region A1, region A2, region A3, and region A4.

The data processing device 207 determines the degree of liquefaction of the ground where vibrations associated with the learning vibration data have been observed on the basis of a region including a point determined by two time averages derived from the results acquired by the test using the vibration table test device 200. Region A0, region A1 region A2, region A3, and region A4 correspond to the degree of liquefaction "0," the degree of liquefaction "1," the degree of liquefaction "2," the degree of liquefaction "3," and the degree of liquefaction "4," respectively.

The degree of liquefaction "0" indicates that liquefaction has not occurred. The degree of liquefaction "1" indicates that the rigidity of the surface layer ground is likely to have decreased due to liquefaction. The degree of liquefaction "2" indicates that the rigidity of the surface layer ground is more likely to have decreased due to liquefaction. The degree of liquefaction "3" indicates that the surface layer ground is likely to have been deformed due to liquefaction. The degree of liquefaction "4" indicates that the surface layer ground is more likely to have been deformed due to liquefaction.

The data processing device 207 stores data indicating the degree of liquefaction determined on the basis of two time averages derived from the results obtained by the test using the vibration table test device 200 as learning liquefaction data in the storage device. The above learning liquefaction data is acquired by the data acquisition unit 11 as an answer of the training data. Also, when the training data is acquired by the test using the vibration table test device 200, the learning liquefaction data is associated with the learning vibration data acquired by the above test.

The machine learning execution unit 12 executes machine learning using the training data and generates a liquefaction evaluation model that is a machine learning model. The machine learning model mentioned herein is, for example, a neural network.

Figure 9:
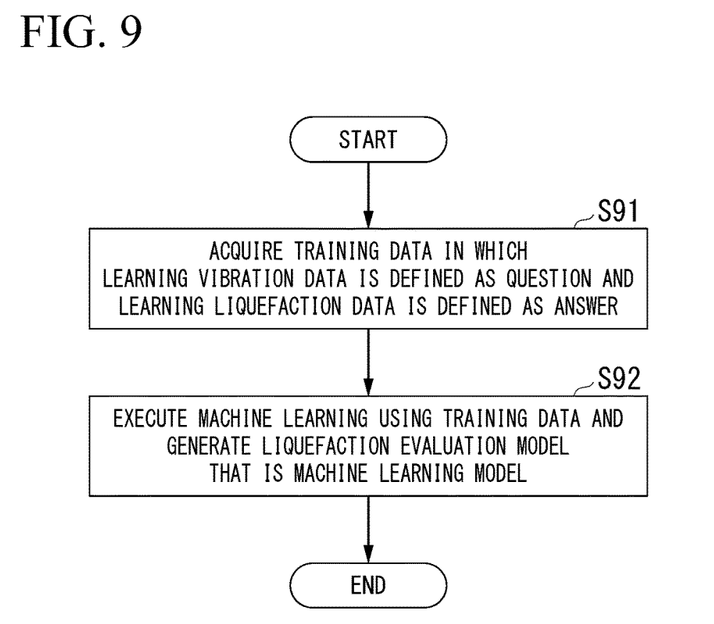
FIG. 9 is a flowchart showing an example of a process executed by a liquefaction evaluation model generation device according to the embodiment of the present invention.

Next, an example of a process executed by the liquefaction evaluation model generation device according to the embodiment will be described with reference to FIG. 9. FIG. 9 is a flowchart showing the example of the process executed by the liquefaction evaluation model generation device according to the embodiment of the present invention.

In step S91, the data acquisition unit 11 acquires training data in which learning vibration data is defined as a question and learning liquefaction data is defined as an answer.

In step S92, the machine learning execution unit 12 executes machine learning using the training data and generates a liquefaction evaluation model that is a machine learning model.

Figure 10:
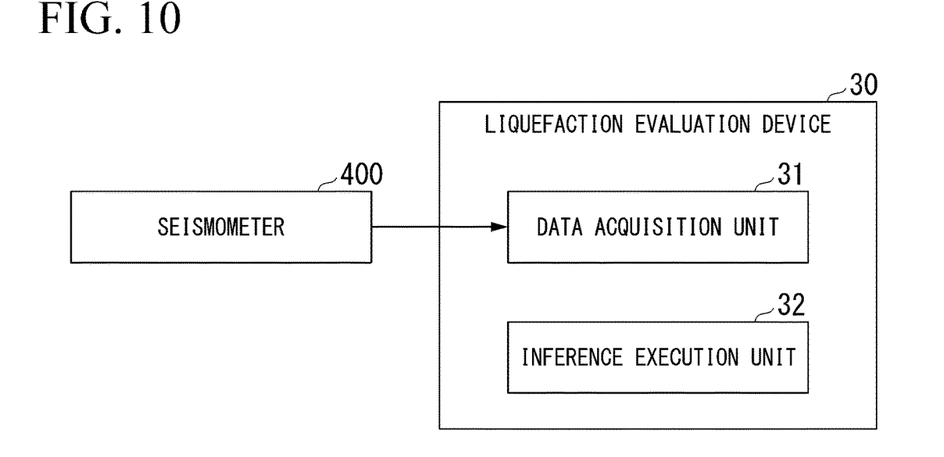
FIG. 10 is a diagram showing an example of a functional configuration of a liquefaction evaluation device according to the embodiment of the present invention.

Next, the liquefaction evaluation device 30 according to the embodiment will be described with reference to FIG. 10. FIG. 10 is a diagram showing an example of a functional configuration of the liquefaction evaluation device according to the embodiment of the present invention. As shown in FIG. 10, the liquefaction evaluation device 30 includes a data acquisition unit 31 and an inference execution unit 32.

The data acquisition unit 31 acquires inference vibration data indicating a physical quantity associated with vibrations observed in the ground. For example, the physical quantity indicated by the learning vibration data is acceleration, velocity, or displacement, and a physical quantity calculated on the basis of these physical quantities associated with seismic motions from earthquakes that have occurred actually and vibrations actually generated by construction work. For example, the data acquisition unit 31 acquires inference vibration data indicating the acceleration of the seismic motion measured by the seismometer 400 shown in FIG. 10 or the physical quantity calculated on the basis of the acceleration.

The inference execution unit 32 inputs the inference vibration data to the machine learning model generated by the machine learning execution unit 12 described above and causes the machine learning model to output inference liquefaction data indicating the degree of liquefaction occurring in the ground where vibrations associated with the inference vibration data have been observed.

Next, an example of a case in which the liquefaction evaluation device 30 according to the embodiment is applied to an earthquake that occurred in the past will be described with reference to FIGS. 11 and 12.

Figure 11:
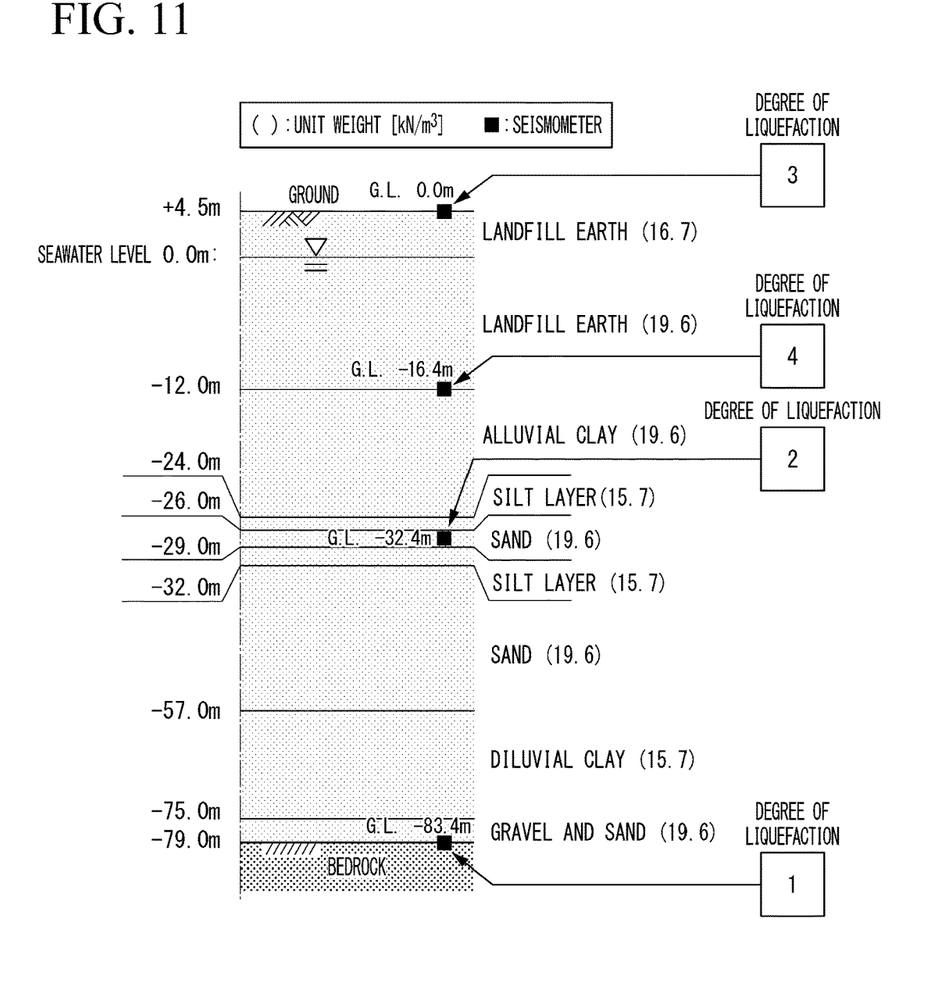
FIG. 11 is a diagram showing an example of a case in which the liquefaction evaluation device according to the embodiment of the present invention is applied to the Hyogo-ken Nanbu Earthquake.

FIG. 11 is a diagram showing an example of a case in which the liquefaction evaluation device according to the embodiment of the present invention is applied to the Hyogo-ken Nanbu Earthquake. The stratum shown in FIG. 11 is the stratum of Port Island, Kobe City. The stratum shown in FIG. 11 is formed by depositing bedrock, gravel and sand (19.6), alluvial clay (15.7), sand (19.6), silt layer (15.7), sand (19.6), silt layer (15.7), alluvial clay (19.6), landfill earth (19.6), and landfill earth (16.7) from the lower layer to the upper layer. Also, the numerical values shown in parentheses represent unit weights [$kN/m^3$] of each layer. Also, as shown in FIG. 11, seismometers are installed at depths of 0.0 m, −12.0 m, −32.4 m, and −83.4 m from the ground surface in the stratum of Port Island, Kobe City.

The inference execution unit 32 inputs inference vibration data indicating a time history of acceleration in each of the east-west direction, the north-south direction, and the vertical direction observed by a seismometer installed at a depth of 0.0 m from the ground surface to the above-described machine learning model generated by the machine learning execution unit 12 and causes the inference liquefaction data indicating the degree of liquefaction "3" to be output. Also, the inference execution unit 32 inputs inference vibration data indicating a time history of acceleration in each of the east-west direction, the north-south direction, and the vertical direction observed by a seismometer installed at a depth of −12.0 m from the ground surface to the above-described machine learning model generated by the machine learning execution unit 12 and causes the inference liquefaction data indicating the degree of liquefaction "4" to be output.

Also, the inference execution unit 32 inputs inference vibration data indicating a time history of acceleration in each of the east-west direction, the north-south direction, and the vertical direction observed by a seismometer installed at a depth of −32.4 m from the ground surface to the above-described machine learning model generated by the machine learning execution unit 12 and causes the inference liquefaction data indicating the degree of liquefaction "2" to be output. Also, the inference execution unit 32 inputs inference vibration data indicating a time history of acceleration in each of the east-west direction, the north-south direction, and the vertical direction observed by a seismometer installed at a depth of −83.4 m from the ground surface to the above-described machine learning model generated by the machine learning execution unit 12 and causes the inference liquefaction data indicating the degree of liquefaction "1" to be output.

The above-described four degrees of liquefaction are consistent with the fact that liquefaction is easier in the ground located at a position shallower from the ground surface. Also, the above-described four degrees of liquefaction are consistent with the fact that liquefaction is easier when the ground is softer.

Figure 12:
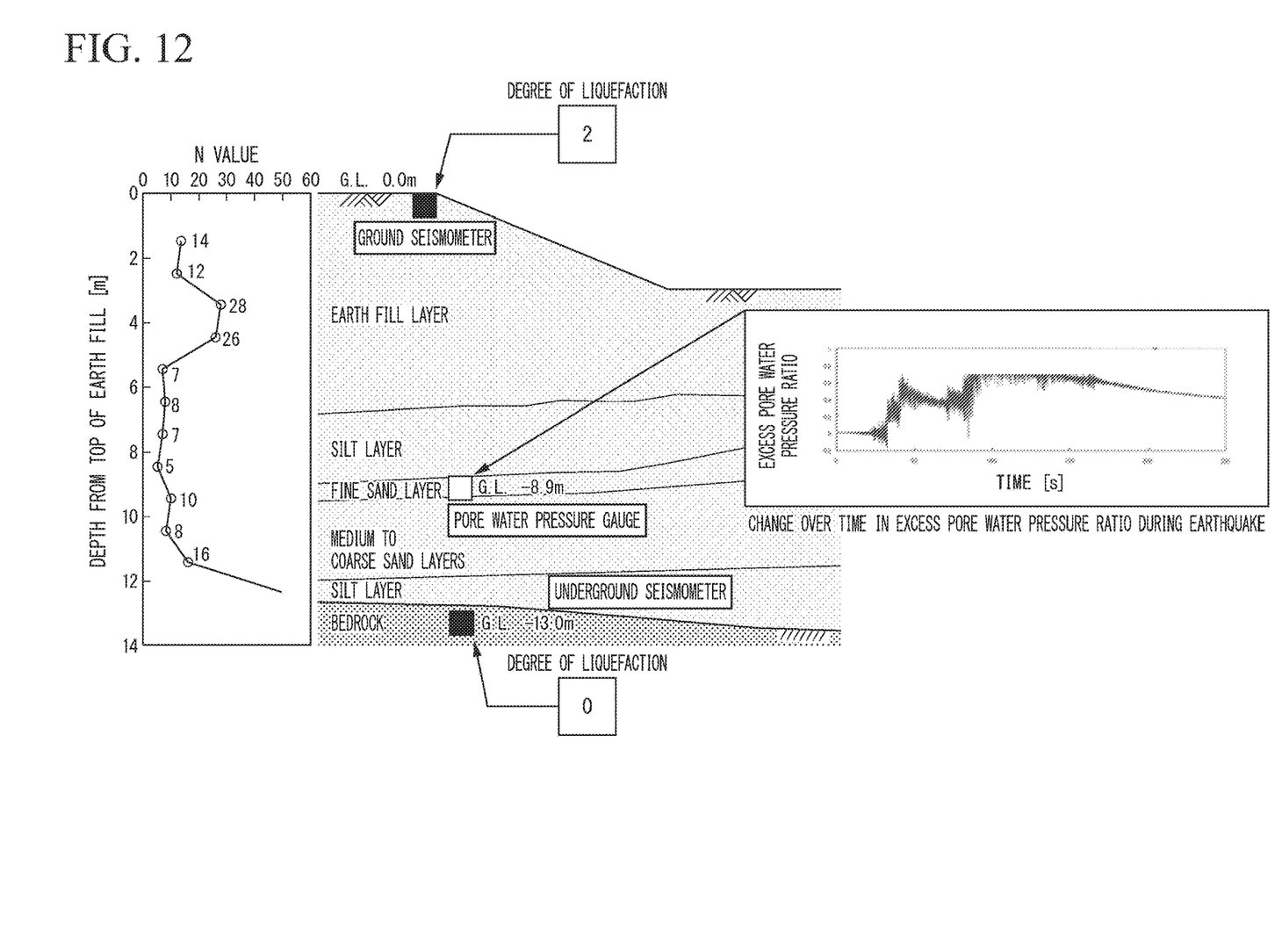
FIG. 12 is a diagram showing an example of a case in which the liquefaction evaluation device according to the embodiment of the present invention is applied to the 2011 off the Pacific Coast of Tohoku Earthquake.

FIG. 12 is a diagram showing an example of a case in which the liquefaction evaluation device according to the embodiment of the present invention is applied to the 2011 off the Pacific Coast of Tohoku Earthquake. The stratums shown in FIG. 12 are the stratum of the embankment near the mouth of the Naruse River in the Nakashimo district of Higashi-matsushima City, Miyagi Prefecture, and the stratum below the embankment. The stratum shown in FIG. 12 is formed by depositing a bedrock, a silt layer, medium to coarse sand layers, a fine sand layer, a silt layer, and an earth fill layer from the lower layer to the upper layer. Also, in the stratum shown in FIG. 12, it can be seen that a pore water pressure gauge was installed at a depth of −8.9 m from the top of the embankment and the excess pore water pressure ratio increased when the 2011 off the Pacific Coast of Tohoku Earthquake occurred as shown in the graph on the right side of FIG. 12. Also, in the stratum shown in FIG. 12, seismometers were installed at depths of 0.0 m and −13.0 m from the top of the embankment.

The inference execution unit 32 inputs inference vibration data indicating a time history of acceleration in each of the east-west direction, the north-south direction, and the vertical direction observed by a seismometer installed at a depth of 0.0 m from the top of the embankment to the above-described machine learning model generated by the machine learning execution unit 12 and causes the inference liquefaction data indicating the degree of liquefaction "2" to be output. Also, the inference execution unit 32 inputs inference vibration data indicating a time history of acceleration in each of the east-west direction, the north-south direction, and the vertical direction observed by a seismometer installed at a depth of −13.0 m from the top of the embankment to the above-described machine learning model generated by the machine learning execution unit 12 and causes the inference liquefaction data indicating the degree of liquefaction "0" to be output.

In relation to the degrees of liquefaction at the above two points, the degree of liquefaction is "0" at a depth of −13.0 m where the ground is relatively strong and the degree of liquefaction is "2" at a depth of 0.0 m in the earth fill ground of a relatively well-compacted embankment so that the N value is relatively about 12 to 14. This is consistent with the fact that the earth fill of the embankment was not damaged or deformed during the earthquake, despite the increase in the N value shown on the left side of FIG. 12 and the pore water pressure at a point of −8.9 m underground.

Figure 13:
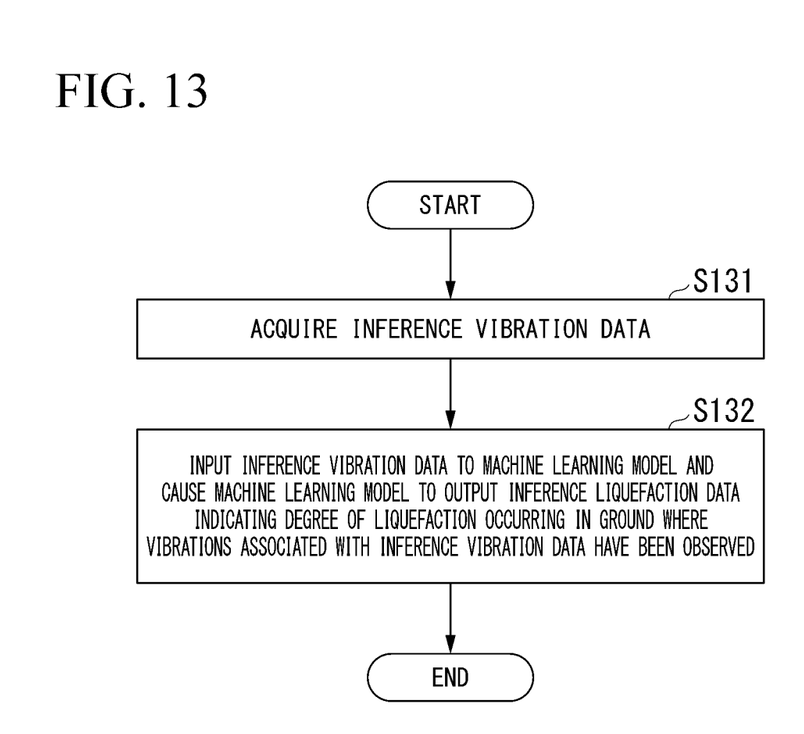
FIG. 13 is a flowchart showing an example of a process executed by the liquefaction evaluation device according to the embodiment of the present invention.

Next, an example of the process executed by the liquefaction evaluation device according to the embodiment will be described with reference to FIG. 13. FIG. 13 is a flowchart showing an example of a process executed by the liquefaction evaluation device according to the embodiment of the present invention.

In step S131, the data acquisition unit 31 acquires inference vibration data.

In step S132, the inference execution unit 32 inputs the inference vibration data to a machine learning model and causes the machine learning model to output inference liquefaction data indicating the degree of liquefaction occurring in the ground where vibrations associated with the inference vibration data have been observed.

The liquefaction evaluation model generation device 10 and the liquefaction evaluation device 30 according to the embodiment have been described above.

The liquefaction evaluation model generation device 10 acquires training data in which learning vibration data indicating a physical quantity associated with vibrations observed in the ground is defined as a question and learning liquefaction data indicating the degree of liquefaction occurring in the ground where the vibrations associated with the learning vibration data have been observed is defined as an answer. The liquefaction evaluation model generation device 10 executes machine learning using the training data and generates a liquefaction evaluation model that is a machine learning model.

Thereby, the liquefaction evaluation model generation device 10 can generate a machine learning model for enabling the degree of liquefaction occurring in the ground where the vibrations associated with the learning vibration data have been observed to be evaluated while omitting the work for collecting data associated with the ground.

Also, the liquefaction evaluation model generation device 10 acquires training data in which learning vibration data indicating a physical quantity associated with vibrations measured in the test using the vibration table test device 200 is defined as a question and learning liquefaction data indicating a pore water pressure measured in the test using the vibration table test device 200 is defined as an answer.

Thereby, the liquefaction evaluation model generation device 10 can implement vibrations obtained by appropriately scaling up or down the seismic motion of the earthquake that occurred in the past, vibrations that occurred in construction work, or the like using the vibration table test device 200 and acquire an amount of training data required to sufficiently learn the machine learning mode. Because the liquefaction evaluation model generation device 10 exerts the above effects, the present invention is particularly useful when the number of seismometers actually installed and the number of pore water pressure gauges actually installed are limited. On the other hand, the number of cases in which seismometers are installed in houses for individuals and the like has increased in recent years, an environment in which the liquefaction evaluation model generation device 10 can collect an amount of training data required to generate a highly accurate machine learning model relatively easily is being developed.

The liquefaction evaluation device 30 inputs inference vibration data indicating a physical quantity associated with vibrations observed in the ground to a machine learning model generated by the machine learning execution unit 12 and causes the machine learning model to output inference liquefaction data indicating the degree of liquefaction occurring in the ground where vibrations associated with the inference vibration data have been observed.

Thereby, the liquefaction evaluation device 30 can evaluate the degree of liquefaction occurring in the ground where the vibrations associated with the inference vibration data have been observed while omitting the collecting work. Also, as described above, because the number of cases in which seismometers are installed in houses for individuals and the like has increased in recent years, the liquefaction evaluation device 30 can input inference vibration data indicating a physical quantity associated with vibrations observed by each of the seismometers to the machine learning model and also utilize the inference vibration data in a hazard map associated with liquefaction.

Also, at least some of functions of the liquefaction evaluation model generation device 10 and at least some of functions of the liquefaction evaluation device 30 may be implemented by hardware including circuitry such as a large-scale integration (LSI) circuit, an application specific integrated circuit (ASIC), a field-programmable gate array (FPGA), or a graphics processing unit (GPU).

Also, at least some of the functions of the liquefaction evaluation model generation device 10 and at least some of the functions of the liquefaction evaluation device 30 may be implemented by hardware and software in cooperation. The software may be stored, for example, in a storage device including a non-transitory storage medium and may be read and executed by hardware. The storage device is, for example, a hard disk drive (HDD) or a solid-state drive (SSD). Alternatively, the above-described software may be stored in a storage device including a removable non-transitory storage medium and may be read and executed by the hardware described above. The above-described storage device is, for example, a DVD or a CD-ROM.

Although an example of a case in which the liquefaction evaluation model generation device 10 includes the data acquisition unit 11 and the machine learning execution unit 12 and the liquefaction evaluation device 30 includes the data acquisition unit 31 and the inference execution unit 32 has been described above, the present invention is not limited thereto. For example, some of the functions of the liquefaction evaluation model generation device 10 may be implemented by specific hardware and the other functions of the liquefaction evaluation model generation device 10 may be implemented by the other hardware. Also, for example, some of the functions of the liquefaction evaluation model generation device 10 may be implemented by specific hardware and software and the other functions of the liquefaction evaluation model generation device 10 may be implemented by the other hardware and software. Also, the same is true for the liquefaction evaluation device 30.

Although an example in which the learning liquefaction data is associated with the learning vibration data acquired by the same test when the training data is acquired by the test using the vibration table test device 200 has been described in the above-described embodiment, the present invention is not limited thereto. For example, all the learning vibration data and all the learning liquefaction data may be associated in a one-to-one or one-to-many relationship. Alternatively, partial learning vibration data and partial learning liquefaction data may be associated in a one-to-one or many-to-one relationship. Alternatively, at least partial learning vibration data and at least partial learning liquefaction data may not be associated. Also, the number of pieces of learning vibration data and the number of pieces of learning liquefaction data may or may not be the same.

Although an example of a case in which the data acquisition unit 11 acquires training data in which learning vibration data indicating a physical quantity associated with vibrations observed in a test using the vibration table test device 200 is defined as a question and learning liquefaction data indicating a pore water pressure observed in a test using the vibration table test device 200 is defined as an answer has been described in the above-described embodiment, the present invention is not limited thereto.

For example, the data acquisition unit 11 acquires the training data in which the learning vibration data indicating a physical quantity associated with vibrations observed by a seismometer attached to the ground is defined as a question and the learning liquefaction data indicating a pore water pressure observed by a pore water pressure gauge embedded in the ground where vibrations associated with the learning vibration data have been observed is defined as an answer. As an example of such a seismometer, for example, the seismometer shown in FIG. 12 can be mentioned. Also, as an example of the above pore water pressure gauge, for example, the pore water pressure gauge shown in FIG. 12 can be mentioned.

Thereby, the liquefaction evaluation model generation device 10 can generate a machine learning model with higher accuracy using training data associated with an earthquake that actually occurred, vibrations associated with actual construction work, and the like. Also, thereby, the liquefaction evaluation device 30 can use such a machine learning model to cause the machine learning model to output inference liquefaction data indicating the degree of liquefaction with higher accuracy.

Although an example of a case in which the data acquisition unit acquires training data in which learning liquefaction data indicating the pore water pressure observed by the pore water pressure gauge 205 embedded in the simulated ground 203 and the pore water pressure observed by the pore water pressure gauge 206 is defined as an answer has been described in the above-described embodiment, the present invention is not limited thereto. The data acquisition unit 11 may acquire training data in which the learning liquefaction data indicating the degree of underground stress observed by an earth pressure gauge embedded in the simulated ground 203 is defined as an answer. Also, the data acquisition unit 11 may acquire training data in which the learning liquefaction data indicating the degree of underground stress observed by the earth pressure gauge embedded in the ground where vibrations associated with the learning vibration data have been observed is defined as an answer.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A liquefaction evaluation model generation device comprising:
    a data acquisition unit configured to acquire training data in which learning vibration data indicating a physical quantity associated with vibrations observed in a ground is defined as a question and learning liquefaction data indicating a degree of liquefaction occurring in the ground where the vibrations associated with the learning vibration data have been observed is defined as an answer; and
    a machine learning execution unit configured to execute machine learning using the training data and generate a liquefaction evaluation model that is a machine learning model.

2. The liquefaction evaluation model generation device according to claim 1, wherein the data acquisition unit is configured to acquire the training data in which the learning vibration data indicating a physical quantity associated with vibrations observed by a seismometer attached to a simulated ground vibrated by a vibration table is defined as a question and the learning liquefaction data indicating a pore water pressure observed by a pore water pressure gauge embedded in the simulated ground is defined as an answer.

3. The liquefaction evaluation model generation device according to claim 1, wherein the data acquisition unit is configured to acquire the training data in which the learning vibration data indicating a physical quantity associated with vibrations observed by a seismometer attached to the ground is defined as a question and the learning liquefaction data indicating a pore water pressure observed by a pore water pressure gauge embedded in the ground where vibrations associated with the learning vibration data have been observed is defined as an answer.

4. The liquefaction evaluation model generation device according to claim 1, wherein the data acquisition unit is configured to acquire the training data in which the learning vibration data indicating a physical quantity associated with vibrations observed by a seismometer attached to a simulated ground vibrated by a vibration table is defined as a question and the learning liquefaction data indicating a degree of underground stress observed by an earth pressure gauge embedded in the simulated ground is defined as an answer.

5. The liquefaction evaluation model generation device according to claim 1, wherein the data acquisition unit is configured to acquire the training data in which the learning vibration data indicating a physical quantity associated with vibrations observed by a seismometer attached to the ground is defined as a question and the learning liquefaction data indicating a degree of underground stress observed by an earth pressure gauge embedded in the ground where vibrations associated with the learning vibration data have been observed is defined as an answer.

6. A liquefaction evaluation device comprising:
    a data acquisition unit configured to acquire inference vibration data indicating a physical quantity associated with vibrations observed in a ground; and
    an inference execution unit configured to input the inference vibration data to a machine learning model generated by executing machine learning using training data in which learning vibration data indicating the physical quantity associated with the vibrations observed in the ground is defined as a question and learning liquefaction data indicating a degree of liquefaction occurring in the ground where the vibrations associated with the learning vibration data have been observed is defined as an answer, and cause the machine learning model to output inference liquefaction data indicating a degree of liquefaction occurring in the ground where the vibrations associated with the inference vibration data have been observed.

7. A non-transitory recording medium recording a liquefaction evaluation model generation program for causing a computer to execute:
    a data acquisition function of acquiring training data in which learning vibration data indicating a physical quantity associated with vibrations observed in a ground is defined as a question and learning liquefaction data indicating a degree of liquefaction occurring in the ground where the vibrations associated with the learning vibration data have been observed is defined as an answer; and
    a machine learning execution function of executing machine learning using the training data and generating a liquefaction evaluation model that is a machine learning model.

8. A non-transitory recording medium recording a liquefaction evaluation program for causing a computer to execute:
    a data acquisition function of acquiring inference vibration data indicating a physical quantity associated with vibrations observed in a ground; and
    an inference execution function of inputting the inference vibration data to a machine learning model generated by executing machine learning using training data in which learning vibration data indicating the physical quantity associated with the vibrations observed in the ground is defined as a question and learning liquefaction data indicating a degree of liquefaction occurring in the ground where the vibrations associated with the learning vibration data have been observed is defined as an answer, and causing the machine learning model to output inference liquefaction data indicating a degree of liquefaction occurring in the ground where the vibrations associated with the inference vibration data have been observed.

9. A liquefaction evaluation model generation method comprising:
    acquiring training data in which learning vibration data indicating a physical quantity associated with vibrations observed in a ground is defined as a question and learning liquefaction data indicating a degree of liquefaction occurring in the ground where the vibrations associated with the learning vibration data have been observed is defined as an answer; and executing machine learning using the training data and generating a liquefaction evaluation model that is a machine learning model.

10. A liquefaction evaluation method comprising:

acquiring inference vibration data indicating a physical quantity associated with vibrations observed in a ground; and inputting the inference vibration data to a machine learning model generated by executing machine learning using training data in which learning vibration data indicating a physical quantity associated with the vibrations observed in the ground is defined as a question and learning liquefaction data indicating a degree of liquefaction occurring in the ground where the vibrations associated with the learning vibration data have been observed is defined as an answer, and causing the machine learning model to output inference liquefaction data indicating a degree of liquefaction occurring in the ground where the vibrations associated with the inference vibration data have been observed.

\* \* \* \* \*